United States Patent
Reisman et al.

(10) Patent No.: US 7,903,851 B2
(45) Date of Patent: Mar. 8, 2011

(54) METHOD AND SYSTEM FOR VERTEBRAE AND INTERVERTEBRAL DISC LOCALIZATION IN MAGNETIC RESONANCE IMAGES

(75) Inventors: James G. Reisman, Plainsboro, NJ (US); Jan Hoeppner, Leipzig (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 933 days.

(21) Appl. No.: 11/539,386

(22) Filed: Oct. 6, 2006

(65) Prior Publication Data

US 2007/0127799 A1 Jun. 7, 2007

Related U.S. Application Data

(60) Provisional application No. 60/727,567, filed on Oct. 17, 2005.

(51) Int. Cl.
 *G06K 9/00* (2006.01)
 *G06K 9/34* (2006.01)
 *G06K 9/36* (2006.01)
(52) U.S. Cl. .......................... 382/128; 382/171; 382/288
(58) Field of Classification Search .......... 382/128–132, 382/171, 288; 600/425; 378/343
 See application file for complete search history.

(56) References Cited

U.S. PATENT DOCUMENTS

| 5,528,703 A | 6/1996 | Lee |
| 5,710,842 A | 1/1998 | Lee |
| 5,867,610 A | 2/1999 | Lee |
| 5,982,944 A * | 11/1999 | Vaidyanathan et al. ....... 382/271 |
| 6,249,594 B1 | 6/2001 | Hibbard |
| 6,954,202 B2 | 10/2005 | Han et al. |
| 7,574,024 B2 * | 8/2009 | Bitter et al. ................... 382/128 |
| 2003/0068074 A1 * | 4/2003 | Hahn ............................. 382/128 |
| 2005/0111715 A1 | 5/2005 | Yoo et al. |
| 2005/0213850 A1 | 9/2005 | Zhang et al. |
| 2006/0052686 A1 | 3/2006 | Zhang et al. |
| 2007/0223799 A1 * | 9/2007 | Weiss ............................ 382/131 |

FOREIGN PATENT DOCUMENTS

JP  02-271836  * 11/1990

OTHER PUBLICATIONS

Zhigang et al. ("Automated Vertebrae detection and segmentation from the whole Spine MR images", Proceedings of the 2005 IEEE, Engineering in medicine and biology 27th Annual conference, Shanghai, China, Sep. 1-4, 2005, pp. 2527-2530).*

* cited by examiner

*Primary Examiner* — Vu Le
*Assistant Examiner* — Amara Abdi

(57) ABSTRACT

A system and method for vertebrae and intervertebral disc localization in magnetic resonance (MR) images is disclosed. In this method, a target spine MR image is segmented by generating a binary segmentation. A spinal cord line is then estimated on the segmented image. Neighboring vertebrae in a region of interest around the estimated spinal cord line are then localized by labeling vertebral regions based on characteristics, such as size and shape, of regions of connected segmented pixels within the regions of interest. A center point of an intervertebral disc between the neighboring vertebrae is then calculated by finding a point halfway between respective borders of the vertebral regions on a line connecting the centers of mass of the vertebral regions.

24 Claims, 6 Drawing Sheets

METHOD AND SYSTEM FOR VERTEBRAE AND INTERVERTEBRAL DISC LOCALIZATION IN MAGNETIC RESONANCE IMAGES

This application claims the benefit of U.S. Provisional Application No. 60/727,567 filed Oct. 17, 2005, the disclosure of which is herein incorporated by reference.

BACKGROUND OF THE INVENTION

The present invention relates to localization of vertebrae and intervertebral discs in MR (Magnetic Resonance) images, and more particularly, to a method for automatic vertebrae and intervertebral disc localization in an MR sagital image slice.

Magnetic Resonance (MR) imaging is frequently used to diagnose abnormalities in the spinal intervertebral discs. Owing to the non-isotropic nature of MR spinal scans, physicians typically align the scanner plane with the disc in order to maximize the diagnostic value and to facilitate comparison with prior and future studies. Commonly, a planning scan is acquired of the whole spine, followed by a diagnostic scan aligned with selected discs of interest. The generally preferred presentation of the spine in an MR imaging study for the purpose of diagnosis is one in which the scanning plane is perpendicular to the axis of a targeted vertebrae or intervertebral disc. By having the vertebrae aligned with the scanning plane, minute peripheral features of the vertebrae can be more easily distinguished and accurate measurements can be made.

In order to create an aligned scan of the spine, an optimal disc plane must be determined. Conventionally, operators manually determined the optimal plane. However, manual determination of the optimal disc plane is tedious and prone to operator variation. Accordingly, automatic methods for aligning the scans of the spinal column based on the orientation of each intervertebral disc have been proposed. Standard methods for determining the orientation of an intervertebral disc require segmentation of the disc from the image. Segmentation methods such as "region growing" in turn require a seed point as an initial step. However, inconsistent results can be achieved depending upon the initial seed location.

It is desirable to determine a consistent location of the vertebral bodies (vertebrae and intervertebral discs), in order to achieve consistent alignment results.

BRIEF SUMMARY OF THE INVENTION

The present invention provides a method for quick and robust localization of vertebrae and intervertebral discs in an MRI sagital slice. This method achieves a consistent location for a center point of an intervertebral disc. The center point resulting from this method can be used to achieve consistent results in automatic intervertebral disc alignment methods.

In one embodiment of the present invention, a target spine MR image is segmented by generating a binary segmentation of the target spine MR image. The binary segmentation is based on lower and upper thresholds determined by adaptive thresholding. The binary segmentation of the target MR image is compared with binary segmentations of preceding and following MR image slices in order to reduce pixels segmented due to noise in the target MR image. A spinal cord line is then estimated on the segmented MR image by fitting a line to points at which a high grouping of connected segmented pixels occur. When a user selects a point on the segmented image to select a region of interest, the region of interest is centered to a point on the spinal cord line closest to the user-selected point. Locations of neighboring vertebrae in the region of interest are then determined by labeling vertebral regions of connected segmented pixels. A center point of an intervertebral disc between the neighboring vertebrae is then calculated by finding a point halfway between respective borders of the vertebral regions on a line connecting the centers of mass of the vertebral regions.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a method for vertebrae and intervertebral disc localization in magnetic resonance (MR) images. This method is described below in terms of manipulating the MR images. One skilled in the art may recognize that such manipulations may be, in various embodiments, virtual manipulations performed on data representing the MR images, and accomplished in the memory or other circuitry/hardware of a computer system.

Figure 1:
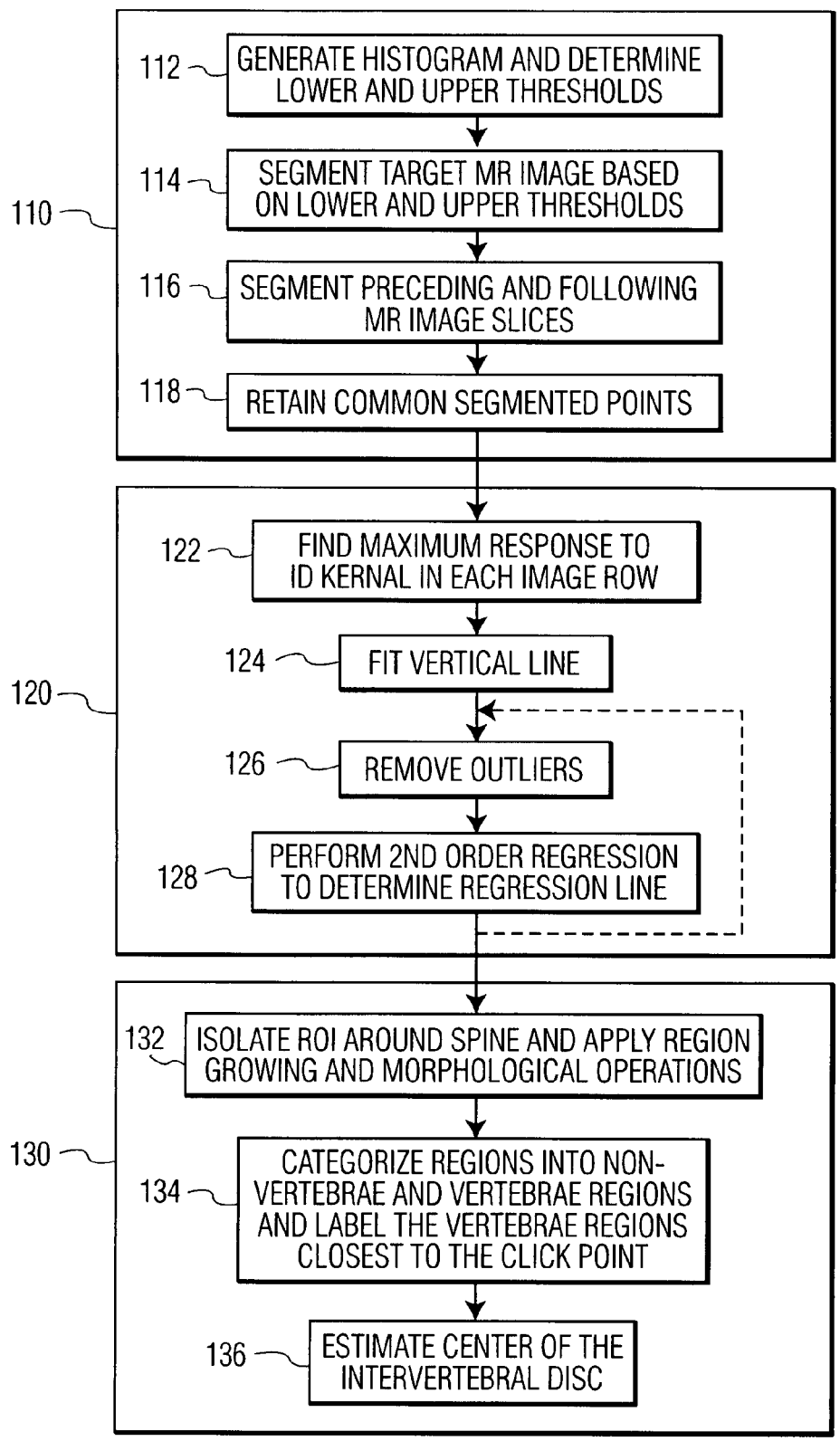
FIG. 1 illustrates a method of determining the location of vertebrae and intervertebral discs in an MR image slice according to an embodiment of the present invention.

FIG. 1 is a flowchart illustrating a method of determining the location of vertebrae and intervertebral discs in an MR image slice according to an embodiment of the present invention. Referring to FIG. 1, the method can be divided into preliminary spine segmentation (110), spine localization (120), vertebrae and intervertebral disc determination (130). FIG. 1 illustrates steps for performing each portion of this method, which are described in greater detail below.

Figure 2:
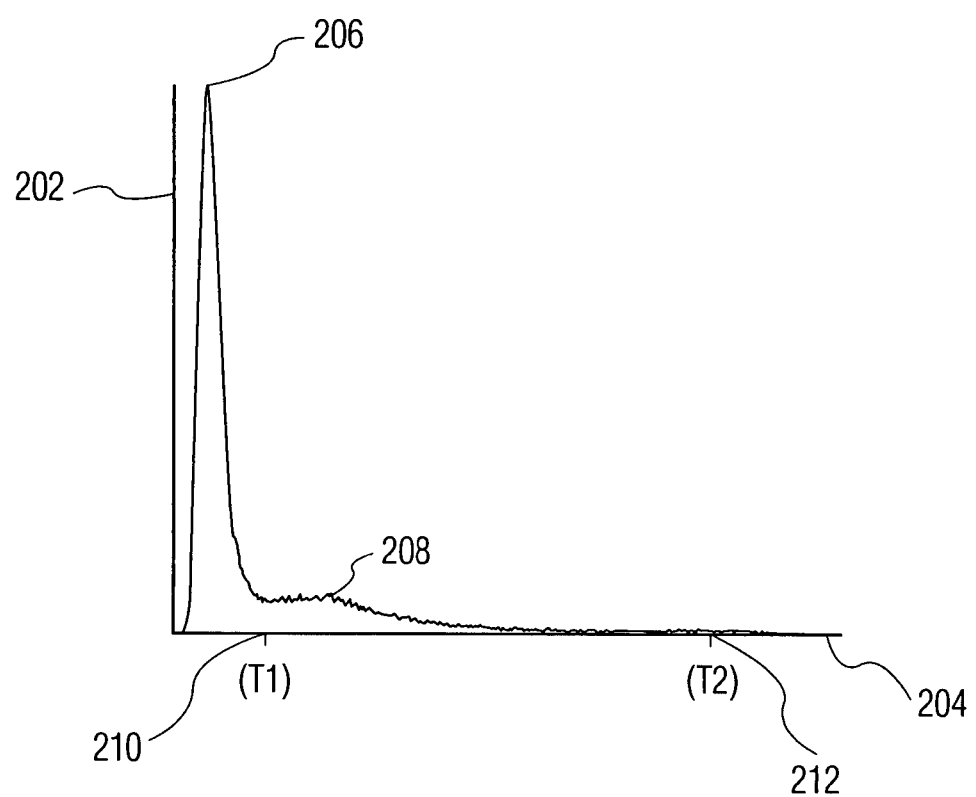
FIG. 2 illustrates a histogram for an exemplary MR image slice.

During preliminary spine segmentation (110), a binary segmentation of a sagital spinal MR image is generated from a target MR image slice. At step 112, a histogram of the pixels of the target MR image slice is generated and lower and upper thresholds are determined based on the histogram by adaptive thresholding. FIG. 2 illustrates a histogram 200 for an exemplary MR image slice. As illustrated in FIG. 2, the histogram shows the frequency 202 of the occurrence of various intensity levels 204 in the pixels of the image. This histogram 200 has a low intensity peak 206 consisting of pixels from the background region and a mid-intensity peak 208 consisting of pixels from the vertebral region. To determine the lower threshold (T1) 210, the low intensity peak 206 is found and the gradient of the histogram 200 is measured immediately after the low intensity peak 206. The lower threshold (T1) 210 is set at an intensity at which the magnitude of the gradient falls below a predetermined level. The upper threshold (T2) 212 is set at an intensity between the lower threshold (T1) 210 and the first zero contribution bin in the histogram 200 that occurs after the low intensity peak 206. A zero contribution bin in the histogram 200 refers to an intensity level that does not occur in any pixels of the image. The placement of the upper threshold (T2) 212 can be set by a coefficient ($\alpha$) between 0 and 1, where 0.5 represents half way between the lower threshold (T1) 210 and the first zero contribution bin. The upper threshold (T2) 212 is used to exclude a certain percentage of the brightest pixels from the segmented image.

Figure 3:
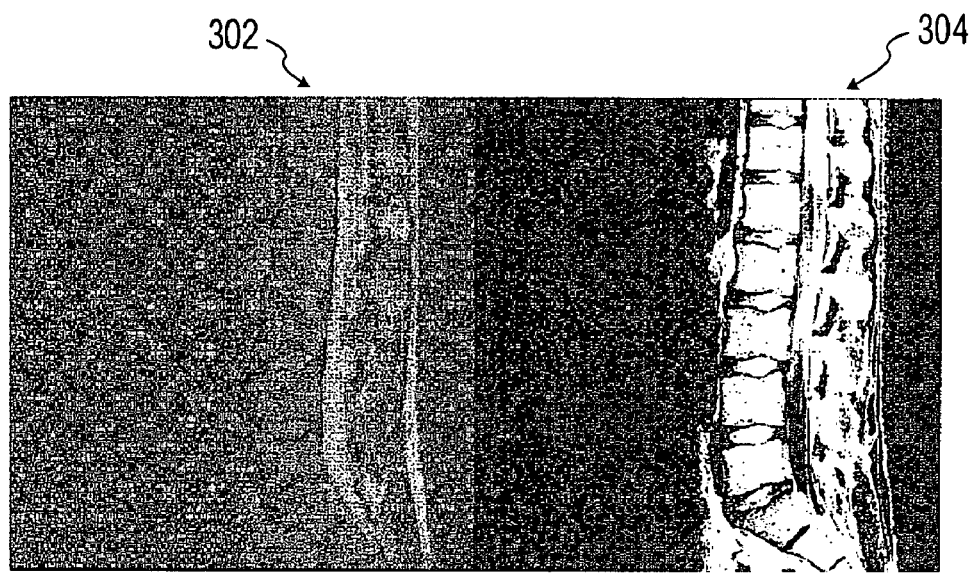
FIG. 3 illustrates an example of an original spine MR image and a corresponding segmented spine MR image.

Returning to FIG. 1, at step 114, the MR image is segmented according the lower and upper thresholds (T1 and T2). The image is segmented by generating a binary image in which pixels having intensities between the lower and upper thresholds (T1 and T2) are set to 1 and all other pixels are set to zero. FIG. 3 illustrates an example of an original spine MR image 302 and the corresponding segmented spine MR image 304.

Figure 4:
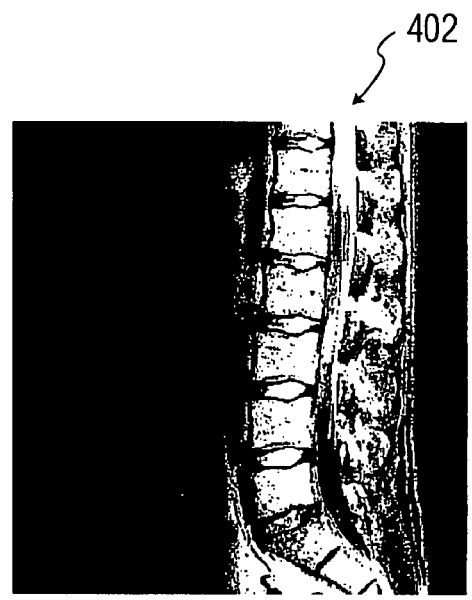
FIG. 4 illustrates an exemplary segmented spine MR image retaining only common segmented points to preceding and following segmented MR image slices.

At step 116, MR image slices preceding and following the target MR image slice are segmented. Similar to the target slice, the preceding and following slices are also segmented into binary images based on adaptive thresholding. Segmented regions due to vertebrae tend to be consistent between neighboring slices, whereas segmented regions due to noise tend not to be consistent over neighboring slices. Accordingly, at step 118, the segmented pixels common to the target, preceding, and following slices are retained. That is, pixels which are not segmented (set to 1) in each one of the target slice, the preceding slice and the following slice are set to zero in the target slice. This removes pixels from the segmented target slice that were segmented due to noise. FIG. 4 illustrates an exemplary segmented spine MR image 402 (corresponding to the segmented spine MR image 304 of FIG. 3) retaining only common segmented points to preceding and following segmented MR image slices.

Returning to FIG. 1, during spine localization (120) a location of the spine is determined on the segmented spine MR image. At step 122, a maximum response to a 1 dimensional (1-D) kernel is found for each horizontal row of pixels in the segmented spine MR image. In the segmented MR image, segmented areas due to vertebrae tend to exhibit connectivity over a local region, and tend to form a roughly vertical line in sagital views. A 1-D weighted summation kernel is swept through each horizontal line of pixels in the segmented image. The size and weighting of the kernel is variable. For example, in one embodiment of the present invention, an evenly weighted kernel that is approximately 20 mm wide is used, but the present invention is not limited thereto. For each horizontal line of pixels, the maximum response to the kernel is the point with the most segmented pixels (set to 1) within the width of the kernel. The location of the maximum response to the kernel for each line of pixels is retained. In cases of multiple equal maximum response points to the kernel on the same horizontal line of pixels, the leftmost pixel is retained as the maximum response point for that line.

At step 124, a vertical line is fit to the maximum response points to the kernel. At step 126, outliers from the vertical line are discarded. The horizontal offset of each of the maximum response points to the vertical line is collected, and a histogram is generated based on the horizontal offsets. This histogram forms a peak, and points greater than a set horizontal distance from the peak are discarded as outliers. At step 128, a $2^{nd}$ order regression of the remaining points is performed to determine a regression line fit to the remaining points.

Figure 5:
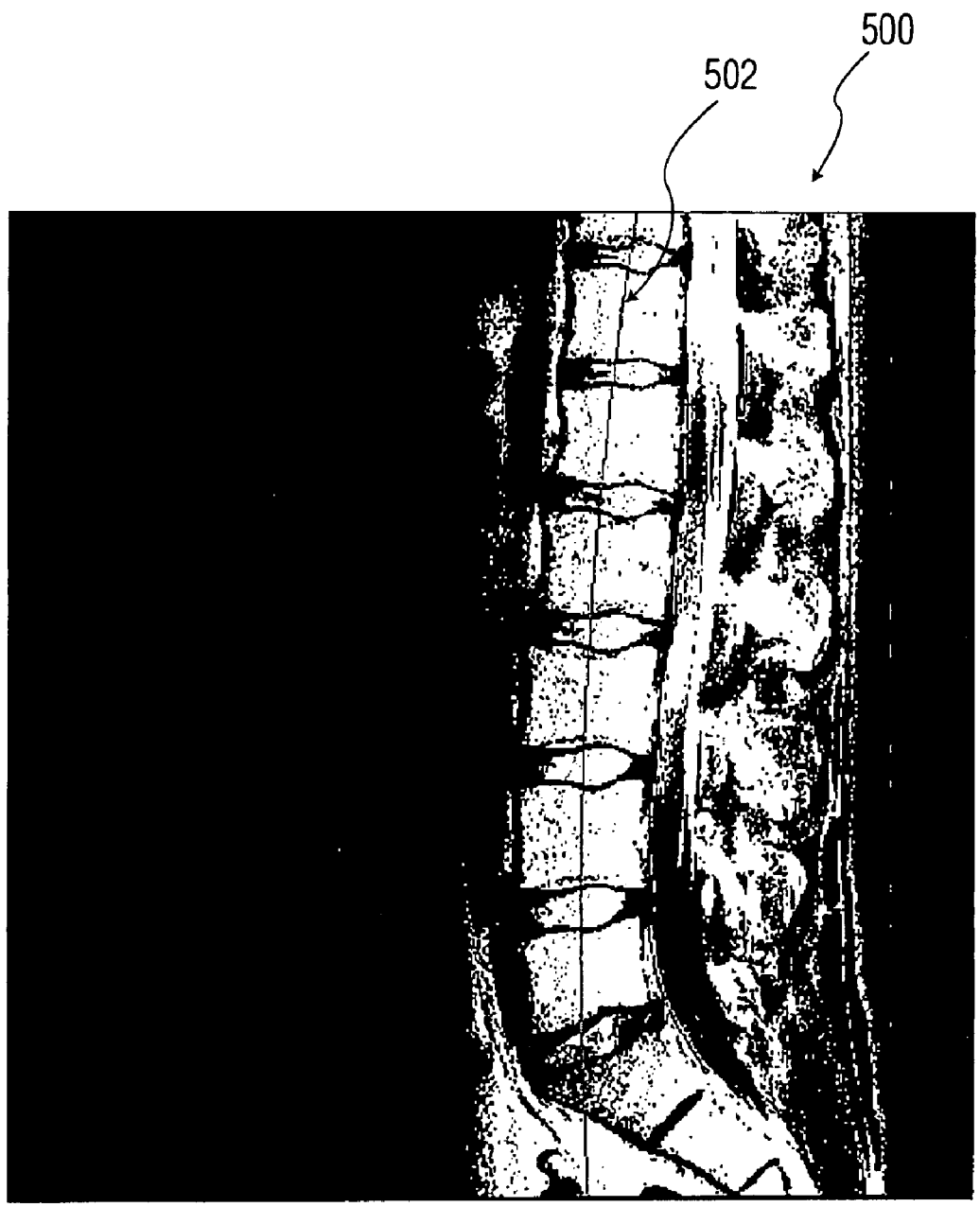
FIG. 5 illustrates an exemplary segmented spine MR image having a regression line representing a location of the spine.

According to one embodiment of the present invention, steps 126 and 128 can be repeated iteratively in order to remove outlying points from the regression line (step 126) and recalculate the regression line using a $2^{nd}$ order regression based on the remaining points (step 128). The final regression line represents an estimation of the spine location. FIG. 5 illustrates an exemplary segmented spine MR image 500 having a regression line 502 calculated using the above described steps. The regression line 502 represents an estimation of the location of the spine in the segmented MR image 500.

Returning to FIG. 1, during vertebrae and intervertebral disc determination (130), the regions representing vertebrae are located and a location of an intervertebral disc between the vertebrae regions is determined. At step 132, a region of interest around the spine is isolated and region growing and morphological operations are performed on the segmented MR image to divide the image into regions of connected segmented pixels. The region of interest can be selected by a user, for example, by clicking on a point in the image. The region of interest is centered around a point on the regression line representing the spine closest to the user selected click point. Region growing and morphological operations are performed on segmented image in the region of interest in order to divide the segmented image into regions of connected segmented pixels. For example, morphological erosion and dilation operations are iterated in order to divide the segmented image into regions of connected segmented pixels. All regions within a set distance from the regression line representing the spine are considered vertebrae candidates.

At step 134, the regions that are vertebrae candidates are categorized into vertebrae and non-vertebrae regions, and the vertebrae regions closest to the click point are labeled: Each candidate region is tested based on size (i.e., the corresponding physical dimensions of the region specified) and compactness criteria (either by determining the elongation coefficient from momentum analysis or by calculating the ratio of segmented to unsegmented pixels in a square boundary that minimally encompasses the region). Vertebrae tend not to elongated, but compact or square. If the segmented region possesses elongation and size within the limits expected for a vertebrae, the region is considered to be a vertebrae region. The two vertebrae regions closest to the click point are then retained.

Figure 6:
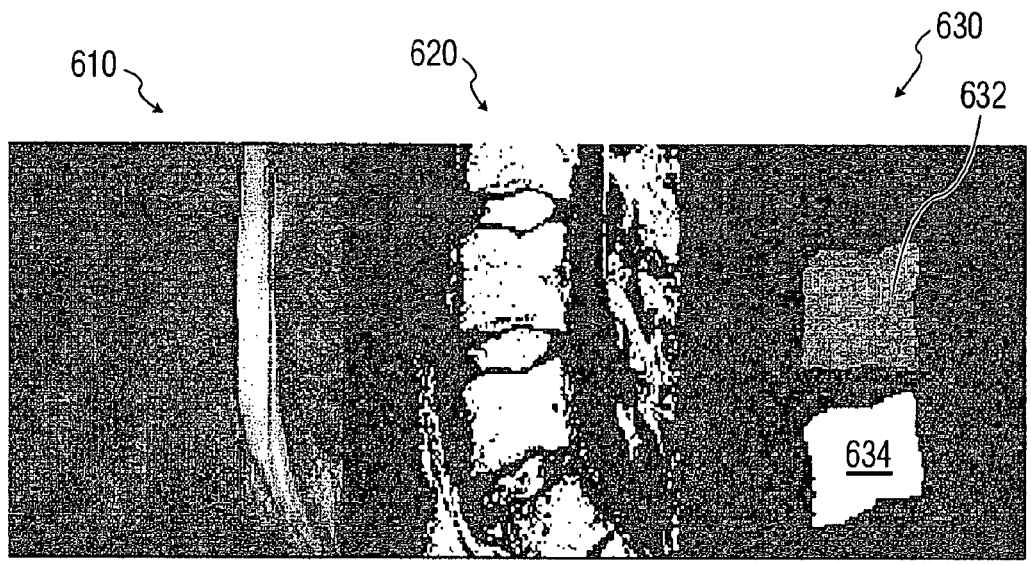
FIG. 6 illustrates an example of an original spine MR image, a corresponding segmented MR image, and a corresponding labeled image.

FIG. 6 illustrates an example of an original spine MR image 610, the corresponding segmented MR image 620, and the corresponding labeled image 630. As illustrated in FIG. 6, the label image 630 includes two labeled vertebrae regions 632 and 634 closest two a user selected region of interest.

Figure 7:
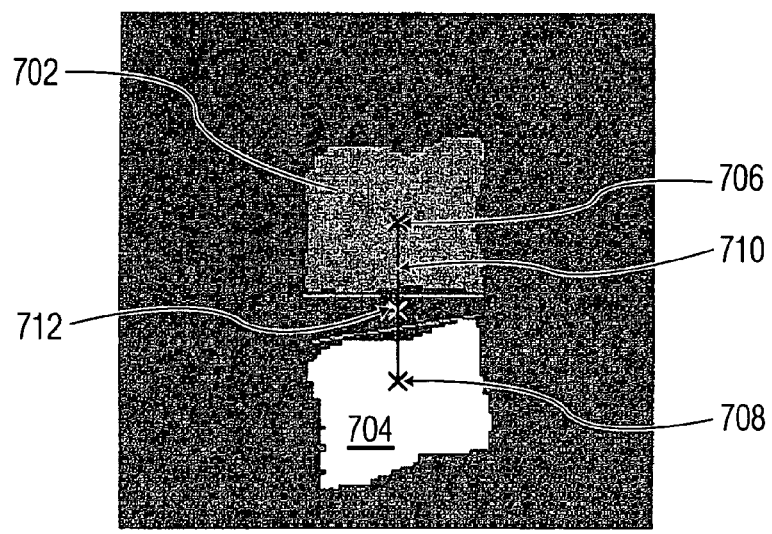
FIG. 7 illustrates estimation of a center point of an intervertebral disc between two vertebral regions.

Returning to FIG. 1, at step 136, a center point representing the center of the intervertebral disc between the two labeled vertebral regions is estimated. FIG. 7 illustrates the estimation of a center point of an intervertebral disc between two vertebral regions 702 and 704. The center of mass 706 and 708 of each vertebral disc 702 and 704 is calculated, and the respective centers of mass 706 and 708 are connected with a line 710. The center point 712 is then defined as the point on the line 710 halfway between the points at which the line 710 exits each of the vertebrae regions 702 and 704. The center point 712 represents the center of the intervertebral disc between the vertebrae regions 702 and 704. This center point 712 gives a consistent location of for the intervertebral disc and can be used as a starting point for disc alignment algorithms.

The steps of the method described above have been described to give a visual understanding of the vertebrae and intervertebral disc localization method. It is to be understood, that the steps may be performed within a computer system using images stored within the computer system. Accordingly, some steps of the above-described method can occur as internal representations within the computer system.

Figure 8:
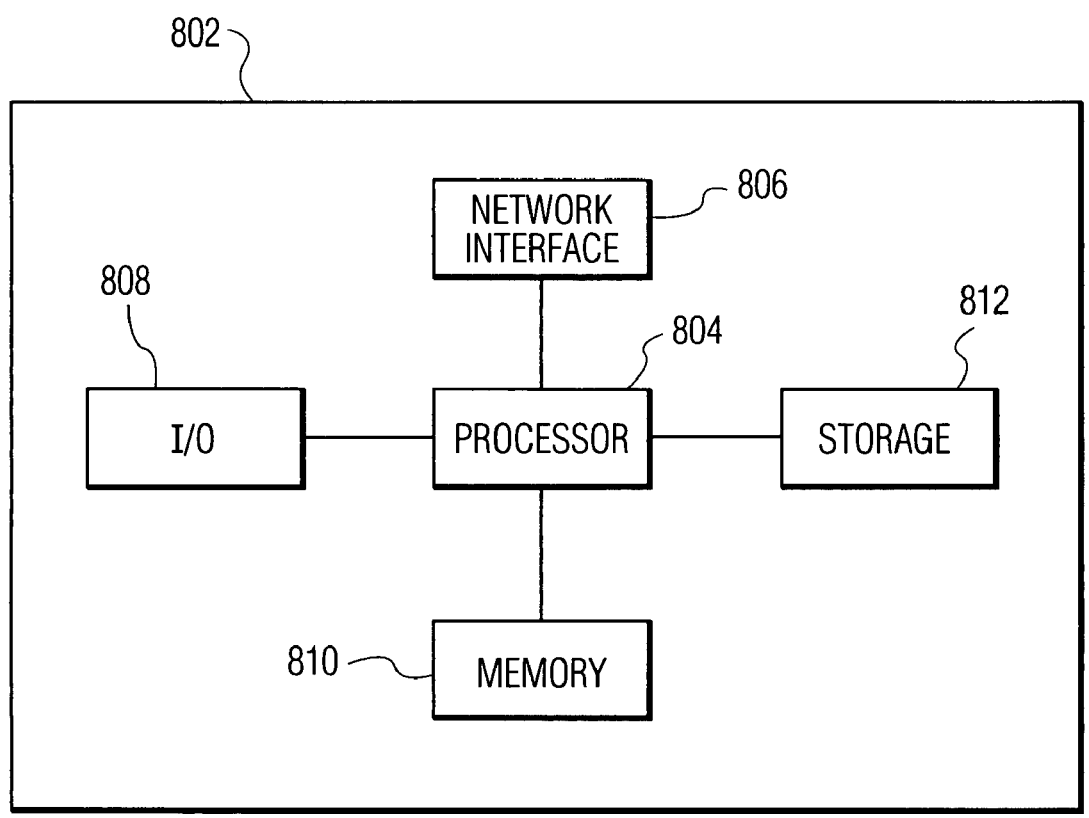
FIG. 8 illustrates a high level block diagram of a computer capable of implementing the present invention.

The vertebrae and intervertebral disc localization method can be implemented on a computer using well known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, applications to perform the steps of the above described method can be defined by the computer program instructions stored in the memory 810 and/or storage 812 and controlled by the processor 804 executing the computer program instructions. The computer 802 also includes one or more network interfaces 806 for communicating with other devices via a network. The computer 802 also includes input/output 808 which represents devices which allow for user interaction with the computer 802 (e.g., display, keyboard, mouse, speakers, buttons, etc.) One skilled in the art will recognize that an implementation of an actual computer will contain other components as well, and that FIG. 8 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
    segmenting a target spine magnetic resonance (MR) image;
    estimating a spinal cord line on the segmented MR image, wherein the spinal cord line represents a location of the spine in the segmented MR image, wherein said estimating step comprises:
        determining a maximum response point to a 1 dimensional (1-D) weighted summation kernel in each horizontal line of the segmented MR image, and
        fitting a vertical line to the determined maximum response points;
    determining locations of neighboring vertebrae in a region of interest based on the estimated spinal cord line on the segmented MR image; and
    determining a center point of an intervertebral disc between said neighboring vertebrae based on the determined location of said neighboring vertebrae.

2. The method of claim 1, wherein said segmenting step comprises:
    generating a histogram of pixels of said target spine MR image;
    determining lower and upper thresholds based on said histogram; and
    generating a binary segmentation of the target MR image based on the lower and upper thresholds.

3. The method of claim 2, wherein the step of generating a binary segmentation comprises:
    assigning a first value to each pixel having a value between the lower and upper thresholds; and
    assigning a second value to each pixel having a value not between the lower and upper thresholds.

4. The method of claim 2, wherein the target MR image is one of a sequence of MR image slices, and said segmenting step further comprises:
    generating binary segmentations of a preceding MR image slice and a following MR image slice to the target MR image; and
    retaining segmented pixels that are segmented in the binary segmentations of each of the target MR image, the preceding MR image slice, and the following MR image slice in the binary segmentation of the target MR image.

5. The method of claim 1, wherein said estimating step further comprises:
    discarding outlying maximum response points from the vertical line; and
    performing a $2^{nd}$ order regression to fit a regression line to remaining maximum response points.

6. The method of claim 5, wherein said step of determining a maximum response point to a 1-D weighted kernel in each horizontal line of the segmented MR image comprises:
    determining at least one maximum response point for each horizontal line at which a number of segmented pixels within a width of the 1-D kernel is greatest; and
    if more than one maximum response points exist for a horizontal line, selecting a left-most one of the maximum response points as the maximum response point for that horizontal line.

7. The method of claim 5, wherein said estimating step further comprises:
    iteratively removing outlying maximum response points from the regression line and performing the $2^{nd}$ order regression to remaining maximum response points to achieve a final regression line.

8. The method of claim 1, wherein said step of determining locations of neighboring vertebrae comprises:
    centering the region of interest around a point on the spinal cord line nearest to a user selected point on the segmented MR image;
    applying morphological and region growing operations to the region of interest to divide the segmented MR image into regions of connected segmented pixels;
    categorizing regions within a certain distance of the estimated spinal cord line as vertebral regions or non-vertebral regions based on characteristics of the regions; and
    labeling two neighboring vertebral regions closest to the user selected point.

9. The method of claim 8, wherein said step of determining a center point of an intervertebral disc comprises:
    calculating a center of mass of each of the neighboring vertebral regions;
    connecting the center of mass of each neighboring vertebral region with a line; and
    calculating the center point of the intervertebral disc to be a point on said line which is halfway between a first point at which said line exits a first one of the neighboring vertebral regions and a second point at which said line exits a second one of the neighboring vertebral regions.

10. A system, comprising:
means for segmenting a target spine magnetic resonance (MR) image;
means for estimating a spinal cord line on the segmented MR image, wherein the spinal cord line represents a location of the spine in the segmented MR image, wherein said means for estimating comprises:
  means for determining a maximum response point to a 1 dimensional (1-D) weighted summation kernel in each horizontal line of the segmented MR image, and
  means for fitting a vertical line to the determined maximum response points;
means for determining locations of neighboring vertebrae in a region of interest based on the estimated spinal cord line on the segmented MR image; and
means for determining a center point of an intervertebral disc between said neighboring vertebrae based on the determined location of said neighboring vertebrae.

11. The system of claim 10, wherein said means for segmenting comprises:
means for generating a histogram of pixels of said target spine MR image;
means for determining lower and upper thresholds based on said histogram; and
means for generating a binary segmentation of the target MR image based on the lower and upper thresholds.

12. The system of claim 11, wherein said means for segmenting further comprises:
means for generating binary segmentations of preceding and following MR image slices to said target MR image; and
means for comparing the binary segmentations of the target MR image and the preceding and flowing MR image slices and retaining segmented pixels that are segmented in the binary segmentations of each of the target MR image and the preceding and following MR image slices in the binary segmentation of the target MR image.

13. The system of claim 10, wherein said means for estimating comprises:
means for discarding outlying maximum response points from the vertical line and performing a $2^{nd}$ order regression to fit a regression line to remaining maximum response points.

14. The system of claim 10, wherein said means for determining locations of neighboring vertebrae comprises:
means for centering the region of interest around a point on the spinal cord line nearest to a user selected point on the segmented MR image;
means for applying morphological and region growing operations to the region of interest to divide the segmented MR image into regions of connected segmented pixels;
means for categorizing regions within a certain distance of the estimated spinal cord line as vertebral regions or non-vertebral regions based on characteristics of the regions; and
means for labeling two neighboring vertebral regions closest to the user selected point.

15. The system of claim 14, wherein said means for determining a center point of an intervertebral disc comprises:
means for calculating a center of mass of each of the neighboring vertebral regions;
means for connecting the center of mass of each neighboring vertebral region with a line; and
means for calculating the center point of the intervertebral disc to be a point on said line which is halfway between a first point at which said line exits a first one of the neighboring vertebral regions and a second point at which said line exits a second one of the neighboring vertebral regions.

16. A computer readable medium storing computer program instructions for performing a method for vertebrae and intervertebral disc localization in magnetic resonance (MR) images, said computer program instructions defining the steps comprising:
segmenting a target spine MR image;
estimating a spinal cord line on the segmented MR image, wherein the spinal cord line represents a location of the spine in the segmented MR image, wherein the computer program instructions defining said estimating step comprise computer program instructions defining the steps of:
  determining a maximum response point to a 1 dimensional (1-D) weighted summation kernel in each horizontal line of the segmented MR image, and
  fitting a vertical line to the determined maximum response points;
determining locations of neighboring vertebrae in a region of interest based on the estimated spinal cord line on the segmented MR image; and
determining a center point of an intervertebral disc between said neighboring vertebrae based on the determined location of said neighboring vertebrae.

17. The computer readable medium of claim 16, wherein the computer program instructions defining said segmenting step comprise computer program instructions defining the steps of:
generating a histogram of pixels of said target spine MR image;
determining lower and upper thresholds based on said histogram; and
generating a binary segmentation of the target MR image based on the lower and upper thresholds.

18. The computer readable medium of claim 17, wherein the computer program instructions defining the steps of step of generating a binary segmentation comprise computer program instructions defining the steps of:
assigning a value of 1 to each pixel having a value between the lower and upper thresholds; and
assigning a value of zero to each pixel having a value not between the lower and upper thresholds.

19. The computer readable medium of claim 17, wherein the computer program instructions defining said segmenting step further comprise computer program instructions defining the steps of:
generating binary segmentations of preceding and following MR image slices to said target MR image; and
retaining segmented pixels that are segmented in the binary segmentations of each of the target MR image and the preceding and following MR image slices in the binary segmentation of the target MR image.

20. The computer readable medium of claim 16, wherein the computer program instructions defining said estimating step further comprise computer program instructions defining the steps of:
discarding outlying maximum response points from the vertical line; and
performing a $2^{nd}$ order regression to fit a regression line to remaining maximum response points.

21. The computer readable medium of claim 20, wherein the computer program instructions defining said step of determining a maximum response point to a 1-D weighted kernel in each horizontal line of the segmented MR image comprise computer program instructions defining the steps of:

determining at least one maximum response point for each horizontal line at which a number of segmented pixels within a width of the 1-D kernel is greatest; and if more than one maximum response points exist for a horizontal line, selecting a left-most one of the maximum response points as the maximum response point for that horizontal line.

22. The computer readable medium of claim 20, wherein the computer program instructions defining said estimating step further comprise computer program instructions defining the step of:

iteratively removing outlying maximum response points from the regression line and performing the $2^{nd}$ order regression to remaining maximum response points to achieve a final regression line.

23. The computer readable medium of claim 16, wherein the computer program instructions defining said step of determining locations of neighboring vertebrae comprise computer program instructions defining the steps of:

centering the region of interest around a point on the spinal cord line nearest to a user selected point on the segmented MR image;

applying morphological and region growing operations to the region of interest to divide the segmented MR image into regions of connected segmented pixels;

categorizing regions within a certain distance of the estimated spinal cord line as vertebral regions or non-vertebral regions based on characteristics of the regions; and labeling two neighboring vertebral regions closest to the user selected point.

24. The computer readable medium of claim 23, wherein the computer program instructions defining said step of determining a center point of an intervertebral disc comprise computer program instructions defining the steps of:

calculating a center of mass of each of the neighboring vertebral regions;

connecting the center of mass of each neighboring vertebral region with a line; and calculating the center point of the intervertebral disc to be a point on said line which is halfway between a first point at which said line exits a first one of the neighboring vertebral regions and a second point at which said line exits a second one of the neighboring vertebral regions.

* * * * *